Aug. 13, 1963  G. LABA  3,100,359
EXPANDABLE MULTIPLE HOOK ASSEMBLY FOR FISHING LURES
Filed Feb. 5, 1960

Inventor:
GEORGE LABA
by:

3,100,359
EXPANDABLE MULTIPLE HOOK ASSEMBLY
FOR FISHING LURES
George Laba, 1370 King St. W., Toronto, Ontario, Canada
Filed Feb. 5, 1960, Ser. No. 7,030
1 Claim. (Cl. 43—35)

This invention relates to an expandable multiple hook assembly for fishing lures.

Of the varieties of problems facing the amateur fisherman, there are two which may be overcome by the provision of the hook assembly of the invention. The proper placement of bait on the hook is a problem of consequence for the amateur. In addition, the setting of the hook when struck by a fish presents a problem which is overcome only by experience. Prior hook assemblies and structures have not provided any simple means for overcoming either of these problems.

It is the main object of this invention to provide a multiple hook assembly adapted to expand or strike outwardly into the fish's mouth when struck by the fish and which due to the struggles of the fish is adapted to be set more firmly to the extent that it may be in a sense self-setting.

It is another object of the invention to provide a multiple hook assembly having an expandable feature and which on contraction is adapted to close about a bait thereby to retain the bait fixed within the assembly for fishing purposes but which is adapted to be released from the assembly when the hook structure expands upon being struck by a fish, thus if desired to preserve the bait in live form during use.

The invention and other objects thereof will be appreciated in more detail with reference to the following specification taken into conjunction with the accompanying drawings.

Figure 1:
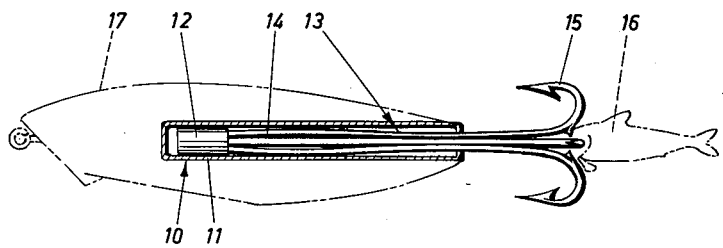
FIGURE 1 is a side elevation of a hook assembly according to the invention illustrating the retention of live bait thereby.
Figure 2:
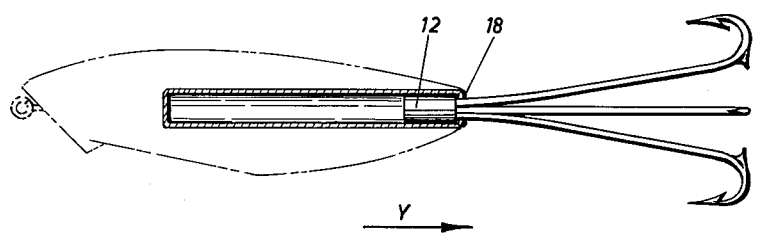
FIGURE 2 illustrates the expansion of the multiple hook assembly of FIGURE 1.

Referring now to the drawings and the preferred form of the invetnion illustrated in FIGURES 1 and 2:

A hook assembly supporting member 10 in the form of a tube 11 slidably carries therein the piston-like body 12 having extending therefrom two or more, or as shown three, hook members 13 each having an outwardly tensioned shank portion 14 and a hook or bight portion 15. In the retracted or contracted position illustrated in FIGURE 1, the three hook members 13 may be caused to impinge upon the bait 16 shown in chain lines. If desired, the body 10 may be mounted within a fishing plug or other suitable lure body 17 shown in chain lines.

In operation, upon one or more of the hook members 15 being struck by a fish, the hooks will be drawn outwardly relative to the tube 11 in the direction of the arrow Y thus allowing the outward tensioning of the hook shanks 14 to cause the hooks 15 to expand outwardly effectively setting the hooks. As shown, the tube 11 embodies rearward flanges 18 adapted to retain the member 12 therein at its most rearward position. It will be observed that the expansion of the hooks may allow the bait 16 to be released.

Figure 3:
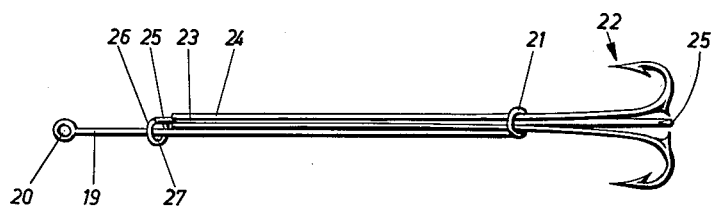
FIGURE 3 illustrates a simplified modified form of the invention illustrated in FIGURES 1 and 2.
Figure 4:
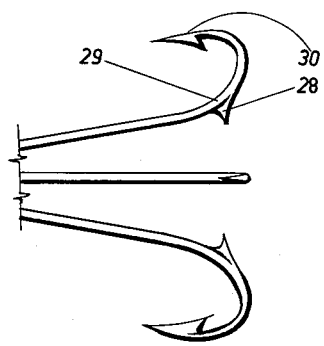
FIGURE 4 is an enlarged graphic detail of the bait retaining means associated with the hook members of the hook assembly of the invention.

A modified form of the invention is shown in FIGURE 3 in which the supporting body or member is in the form of a wire body 19 having an eyelet 20 adapted to be fastened to a flat type lure or directly to a fishing line (not shown). The other end of the body 19 provides a guide loop 21 which may be in the form of the wire loop illustrated or of a slightly tubular nature. The two or more hook members 22 are joined together as at 23 in their shank areas 24 in such manner that a continuation of one of the shanks or the common member to which they are joined and which for convenience is designated by the numeral 25 presents at its forward end 26 a loop or tube portion 27 extending about the guide body 19. The outwardly extending shanks 24 and hooks 25 thereon are normally tensioned outwardly and held in restricted position to grasp a bait when the hook structure is disposed forwardly on body 19 such that the structure may be said to be in the retracted position. Again the function upon striking by a fish is similar to the function described in FIGURES 1 and 2.

The particular design of the hooks 15 or 25 may be such as to provide an additional feature of the invention comprising the bait retaining spurs 28 located at the heel portion 29 of each of the hooks 30 in such manner that when such a hook assembly as described is retracted or closed to the contracted position, the spurs 28 are adapted to impinge upon live bait. By this means the bait may be retained live during use.

It is intended that the present disclosure should not be construed in any limiting sense other than that indicated by the scope of the following claim.

What I claim is:

A fishing lure assembly having a generally fish shaped support body and comprising in combination: a cylindrical piston of length substantially greater than the width thereof; a plurality of hook members having bights and elongate inherently springable shank portions; the ends of said shank portions being rigidly secured to said piston to dispose said shank portions in outwardly flared relation thereto; a tube located within said support body having an open end substantially co-terminus with the trailing end of said body to retain said piston in slidable relation therewithin and said shank portions in biased mutual proximity; a bait gripping spur disposed inwardly from each said bight for co-operative bait gripping action with corresponding spurs on adjacent bights when said shanks are retracted within said tube; and an inwardly turned flange portion on the open end of said tube to arrest the movement of said piston and said shank portions and retain said piston and the ends of said shank portions within said tube; said piston and said shank portions being reciprocably movable outwardly relative to said tube and support body by the pull of a striking fish and said hooks being expandable outwardly when said shank portions are extended through the flanged end of said tube and said spurs releasing the bait when said hooks are so expanded outwardly.

References Cited in the file of this patent
UNITED STATES PATENTS
13,081    Cook _____ June 19, 1855

(Other references on following page)

UNITED STATES PATENTS

| | | |
|---|---|---|
| 712,497 | Coffin | Nov. 4, 1902 |
| 754,349 | Scott | Mar. 8, 1904 |
| 1,172,780 | Ferree | Feb. 22, 1916 |
| 1,354,952 | Bullock | Oct. 5, 1920 |
| 1,623,870 | Goodgame | Apr. 5, 1927 |
| 1,774,539 | Ahlfors | Sept. 2, 1930 |
| 2,242,592 | Noxon | May 20, 1941 |
| 2,357,357 | Premo | Sept. 5, 1944 |
| 2,526,288 | Shields | Oct. 17, 1950 |
| 2,550,376 | Peterson | Apr. 24, 1951 |
| 2,730,831 | Williams | Jan. 17, 1956 |
| 2,848,836 | Dodd | Aug. 26, 1958 |

FOREIGN PATENTS

| | | |
|---|---|---|
| 336,483 | France | Jan. 16, 1904 |
| 625,588 | France | Apr. 25, 1927 |
| 802,205 | France | June 6, 1936 |
| 438,435 | Italy | Aug. 10, 1948 |
| 266,034 | Switzerland | Apr. 17, 1950 |